INVENTOR.
SAMUEL SILBERMAN

VALUES OF COMPRESSIBILITY & ACIDITY WITH VARIOUS TEMPERATURE CHANGES

INVENTOR.
SAMUEL SILBERMAN

United States Patent Office 2,701,202
Patented Feb. 1, 1955

2,701,202

PRODUCTION OF HEAT-TREATED CHEESE PRODUCTS FROM MILK OF LOW FAT CONTENT

Samuel Silberman, Brooklyn, N. Y., assignor, by mesne assignments, to Faster Food Products Company, New York, N. Y., a partnership Application June 21, 1952, Serial No. 294,898

12 Claims. (Cl. 99—116)

This invention relates to the production of heat-treated cheese products of the cottage cheese type, made from skim milk or milk of low fat content. It has for its principal object the provision of an improved process by which such heat-treated cheese products of good texture can be made expeditiously and without the necessity of including the substantial proportions of cream or fat heretofore required for heat stability of such cheese products.

Milk of low fat content (that is, having no more than 2% by weight of butter fat) is used for the production of several types of cheese. Among the most popular of these so-called skim-milk cheeses are cottage cheese and bakers' cheese, both of which are of the cottage cheese type, that is, soft, smooth and unripened or uncured. They are commonly used for direct consumption, sometimes enriched with cream as an additive. Also, large quantities of bakers' cheese are used for making cheese cakes and other cheese products.

It is well-known, however, that skim-milk cheeses of the cottage cheese type, as commonly made heretofore, are inherently unstable to heat. It has been recognized and accepted that such skim-milk cheeses, when heated to a temperature of about 130° F. or higher, undergo what is referred to as "wheying off"; that is, they separate into free whey and hard or lumpy casein, so that the cheese no longer has a soft, smooth and homogeneous consistency. For this reason, pasteurization and other heat treatments of cottage type cheeses have been limited generally to cheese having a substantial butter fat content, usually at least 8% by weight. The presence of butter fat in this proportion gives the cheese the desired heat-stability for pasteurizing, etc., but such cheeses cannot be classified as skim-milk cheeses (cheeses of low fat content). It would obviously be desirable to provide pasteurized or other heat-treated skim-milk cheeses of the cottage cheese type, but heretofore they have not been produced commercially because of the serious impairment of their texture when heated to about 130° F.

I have found that cheese curds of the skim-milk, cottage cheese type have a high degree of heat stability if the separation of the curds from the whey is effected in a certain manner. Specifically, I have discovered that the curds will be heat stable if this separation is effected in a centrifuging operation wherein the separated whey is discharged from the centrifugal bowl or locus as a lighter component, and the separated curds are discharged through the outer or peripheral part of the bowl as a heavier component. Contrary to normal expectation, the curds produced in this manner have good heat stability even though their fat content is as low as possible.

Evidently, the heat stability of skim-milk curds of the cottage cheese type, separated in this way, is due to some mechanical action on them incident to the centrifuging operation, including the compacting of the separated curds in the peripheral part of the centrifugal bowl and their discharge through narrow passages or nozzles in the bowl periphery under the pressure generated centrifugally in the bowl, and the impacting of the discharging curds against the usual stationary receiver or collector surrounding the centrifugal bowl. In any case, the base curds discharged from the centrifuge have a different appearance, when examined microscopically, than curds of the same moisture content obtained from the same mix by conventional bagging or draining methods. In the centrifuged curds, the agglomerations of the solid particles which make up the curds are of uniformly small size, practically all of these agglomerations being between 2 and 3μ; whereas the bagged curds show irregular agglomerations, large and small, of the solid particles. In the centrifuged curds, there are no long particles, and the clusters or agglomerations of particles appear to be enclosed by adhering fine particles of moisture; whereas in the bagged curds there is no sign of moisture surrounding the agglomerations.

According to the present invention, the cottage cheese type curds obtained from the centrifuging operation as previously described, and containing less than 8% by weight of butter fat, are heated to a temperature of at least 130° F. for further processing of the curds. When thus heated, the curds will retain their soft, smooth and homogeneous consistency, even without the addition of cream or other special measure to prevent separation of the mass into free whey and hard, lumpy casein. This heating of the curds can be effected in any desired manner, although it should, of course, be done under conditions which will avoid local burning of the curds during the heating.

In the preferred practice of the invention, the cottage cheese curds of low fat content, as previously described, are discharged from the centrifuging operation with a minimum of about 20% by weight of milk solids, and are pumped to and through a pasteurizer or other heat-treating device where they are heated as aforesaid. In this way, the final product of the heat treatment will have the necessary lawful minimum content of solids; and it will not have an excess of objectionable whey solids, which are mostly lactose, lactolbumins and lactoglobulins, since the latter will be discharged from the centrifuge with the lighter whey component. Even when they contain 20% or more of milk solids, the curds from the centrifuging operation can be readily pumped mechanically to the heat-treating device, because they can be pre-heated to whatever degree is necessary (usually 90–110° F.) to reduce their viscosity for pumping purposes, without any tendency toward "wheying off." It is advantageous, in fact, to heat the mix prior to the centrifuging so that the separated curds are discharged at a temperature (e. g., 90° F. or more) at which their viscosity is low enough for easy pumping to and through the heat-treater, with a minimum of 20% solids.

If desired, however, the curds discharged from the centrifuging may be diluted with water to reduce their viscosity before being pumped to the heat-treater, it being apparent that such dilution will not affect the desired reduction of whey solids attained by discharging the curds from the centrifuge with a minimum of 20% solids.

In one form of the present invention, the heat treatment of the separated curds discharged from the centrifuge is effected incident to dehydrating the curds to form a powdered cheese product, which may be used either as such or re-constituted by the addition of water with or without butter fat. Preferably, the curds are heated to a pasteurizing temperature prior to the dehydrating operation, to increase the shelf life of the powdered product. The dehydrating of the curds can be done by conventional spray drying, as by pumping the curds under high pressure through spray nozzles into a heated drying chamber, or by pumping them to a high-speed centrifugal atomizer within a heated drying chamber. As previously mentioned, the centrifugally separated curds even with a solids content of 20% or more can be readily conditioned for easy pumping to and through the dehydrator by heating them to reduce their viscosity, since they will not "whey out" under the heating; or, if desired, the curds can be diluted with water to reduce the percentage of solids and the viscosity. While the centrifuging could be controlled to discharge the curds with less than 20% of solids, so that the curds would be more fluid for pumping to the dehydrator; this would result in impairment of the flavor of the dried cheese product due to excessive whey solids therein. Consequently, even if the curds are to be pumped to the dehydrator with a solids concentration less than 20%, I prefer to discharge the curds from the centrifuge with a minimum of 20% solids.

The relatively high concentration (20% or more) of solids not fat in the curds discharged from the centrifuging operation can be attained by centrifuging the mix during a period when the curds are at substantially the maximum compressibility reached after completion of the chemical reactions incident to setting of the mix, as disclosed in a copending application of George J. Strezynski, Serial No. 259,360, filed December 1, 1951. Since I prefer to use the method of this Strezynski application to obtain the aforesaid concentration of the solids in the centrifuged curds, the Strezynski method will now be described.

The Strezynski method involves a rapid separation of the curds from the whey after the titratable acidity of the cheese set has reached a value of at least about .68%, at a pH of about 4.8 or less, but while the compressibility of the curds in the set is at about the maximum compressibility attained after this acidity has been reached. By "compressibility" of the curds is meant the extent to which the solids can be compacted under a given force, leaving free liquid or whey. Thus, if the curds are centrifuged for forty seconds in a standard De Laval 10 cc. glass test tube centrifuge (operating at 17,000 R. P. M.), the extent to which the solids are compacted at the closed or outer end of the tube is here regarded as the standard of measure of their compressibility. If, under the action of this centrifuging, the solids are compacted to a volume which is 30% of the total volume of the mix placed in the tube (the remaining 70% being free whey), the curds are considered as having a 30% compressibility factor. The lower this percentage, the higher the compressibility of the curds.

In the setting of skim-milk cheese mixes according to conventional practices, the compressibility of the curds improves during the initial setting of the mix and then becomes poorer as the titratable acidity increases from a certain value (usually well under .68%) prior to completion of the chemical reactions. According to the aforesaid Strezynski application, this normal loss of compressibility of the curds after this point of titratable acidity is reached can be arrested by the use of a low acid starter culture which produces a maximum titratable acidity of about .68% to .8% at a pH of about 4.5 to 4.8, or can be largely recovered by heating the set to a temperature of at least about 100° F., or both these expedients can be used. Preferably, the titratable acidity of the cheese set is caused to level off at a value of .68% to .8% at a pH of 4.6 to 4.8, at which time the set is centrifuged to separate curds from whey. However, the titratable acidity can be brought to a value somewhat higher than .8% if the set is then immediately heated to a temperature of at least 100° F. and held at the elevated temperature until the centrifuge is completed. In other words, if at the time of centrifuging the mix the titratable acidity thereof is substantially less than .68%, or the pH substantially less than 4.6, the discharged curds will not have the desired dryness because of their poor compressibility when centrifuged, unless the mix is subjected to the aforesaid heating prior to the centrifuging.

Thus, one feature of the Strezynski method resides in holding down the titratable acidity of the mix after it has reached an acidity of at least .68% (with pH at 4.8 or less) and at a time when the curds are at substantially maximum compressibility, this restraining of the acidity being effected for a period (e. g. about two hours) sufficient to pass the mix through the centrifuge.

In the preferred practice of the Strezynski method, the aforementioned low acid culture is used in the mix in relatively large quantity as a starter, usually about 10–20% of the volume of the milk used in the mix, and a small amount of calcium chloride (for example, 1.5 oz. per 1000 lbs. of milk) is added. This not only holds down the titratable acidity after the pH has decreased to the prescribed value of 4.8 or less during the setting, thereby preventing any appreciable decrease in the compressibility of the curds, but also greatly shortens the time required for setting. For example, the setting time may be reduced to about 5 hours for bakers' cheese. The amount of rennet (if any) used in the mix is preferably kept at a minimum (for example, .1 oz. per 1000 lbs. of milk). Generally, when less starter is used, it is desirable to use more rennet. By means of the short-time set, the acidity of the mix and the compressibility of the curds are more readily and accurately controllable, so that approximately optimum compressibility is obtained and maintained after completion of the chemical reactions. In this way, too, the need for frequent determinations of the pH and acidity of the mix during the setting is greatly reduced or eliminated. Moreover, the short setting period evidently results in a better maximum compressibility of the curds after completion of the chemical reactions, probably because there is less gassing or aeration of the curds during the shorter period.

The temperature at which the mix is set, for best results, is important. Preferably, a setting temperature between 68° and 92° F. is used, as this range allows a short-time set while providing curds with a good texture. Generally, lower setting temperatures will require more starter culture or a longer setting time, or both; and higher setting temperatures will tend to make the curds too hard. Setting temperatures of less than 80° F. will generally make the controls more difficult and should be avoided if possible. Temperatures higher than 92° F. may be used to advantage over short periods to counteract excessive lactic acidity and decrease in compressibility, as may occur when the set gets out of control due to mistakes or carelessness of operators, or to a faulty starter. Thus, when the set is heated to about 100° F. prior to the centrifuging, the compressibility of the curds will increase (improve). For best results, the temperature at which the mix is centrifuged should not be less than 70° F. and is preferably about 100° F. Temperatures substantially higher than about 100° F. usually tend to give a granular consistency to the curds, although this effect is minimized when the higher temperature is held for only a short period.

The compressibility of the curds during the centrifuging is, as previously mentioned, critical with respect to the dryness of the curds discharged from the centrifuge. If the compressibility factor previously mentioned is as high as 18%, the discharged curds will not be sufficiently dry for bakers' cheese. Preferably, the mix is centrifuged while the curds have a compressibility factor of about 16% or less, although this value may be higher when the discharged curds do not have to be as dry as bakers' cheese, for example. A compressibility factor of about 15% or less during the centrifuging is optimum for most skim-milk cheeses. By centrifuging the set while the compressibility factor is at this value, and while the set is at about 100° F. and has approximately 4.7 pH and .7% acidity, it is possible to discharge from the centrifuge a finished bakers' cheese of good texture having as high as 25% dry solids.

It will be understood that the conditions under which the cheese mix is set and centrifuged, prior to heat treatment of the centrifugally separated curds in accordance with the present invention, are preferably controlled according to the teaching in the aforesaid Strezynski application, as in this way the cheese set can be centrifuged to provide consistently a relatively dry curd of good texture having less than 8% of butter fat.

For a better understanding of the invention, reference may be had to the accompanying drawings, in which Fig. 1 is a graph of curves showing the behavior of a long-time set and also a short-time set, with respect to pH value, titratable acidity and compressibility of the curds, and showing an optimum condition for centrifuging the short-time mix according to the aforesaid Strezynski process;

Figure 1:
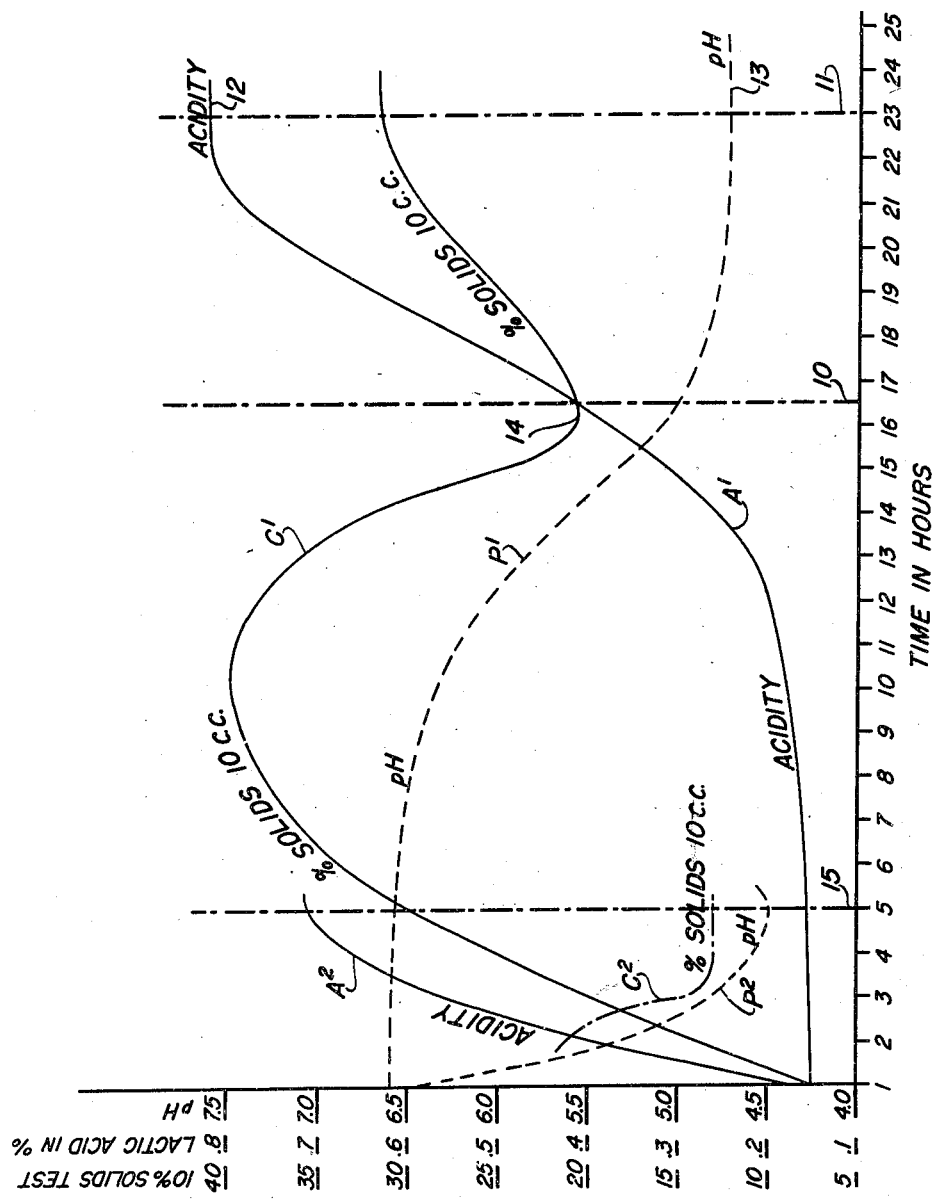

Referring to Fig. 1, the curves $A^1$, $P^1$ and $C^1$ represent, respectively, the percentage titratable acidity pH value and the previously mentioned percentage factor of the compressibility of the curds of a conventional long-time set during the setting period; and the curves $A^2$, $P^2$ and $C^2$ represent the corresponding values for a short-time set. The values of the percentage compressibility factor for the curves $C^1$ and $C^2$ were determined by test-tube centrifuging as previously described. The compressibility curve $C^1$ shows that in the long-time set the maximum compressibility of the curds, after the acidity has risen substantially, is reached in about 16 hours and remains approximately maximum (lowest percentage value) for about one hour. Thus, the optimum time for centrifuging the mix, to obtain curds of maximum dryness, is indicated generally by the line 10. However, at this point the titratable acidity ($A^1$) is only .42% and the pH value ($P^1$) is 5.0, so that the curds discharged from the centrifuge are gummy. On the other hand, if the centrifuging is deferred until the acidity reaches about .68% and the pH decreases to about 4.8, so that the chemical reactions can proceed sufficiently to provide curds of good texture, the compressibility of the curds becomes much poorer. That is, the aforementioned compressibility factor rises from about 21% to about 26%, so that the curds discharged from the centrifuge would have too much moisture for most purposes. At the point 11, where the acidity and pH have levelled off at about .82% and 4.75, respectively, the compressibility of the curds levels off to a value in excess of 30%, which results in the centrifugally separated curds being too watery.

In accordance with the Strezynski process, the pH and the acidity of the set are controlled so that the curves $P^1$ and $C^1$ substantially level off when the compressibility of the curds is about at its best (minimum percentage value on curve $C^1$), at values of 4.8 or less and .68% or greater, respectively. In other words, the low point 10 of the compressibility curve is in effect displaced to the right relative to the curves $P^1$ and $A^1$, so that the titratable acidity, pH and compressibility tend to level off at about the time when the lowest point of the compressibility curve is reached after the acidity has risen to at least .68%. This effect can be obtained by heat treatment of the mix, as will be described in detail presently, but is preferably obtained by means of the additives introduced into the low fat-content milk in preparing the mix or set. For example, the setting of the mix at a given temperature can be accelerated by the use of calcium chloride or rennet, or by increasing the amount of starter culture, or by a combination of these expedients, whereby the level portions 12 and 13 of the curves $A^1$ and $P^1$, respectively, will occur sooner in relation to the optimum compressibility 14 on the curve $C^1$. By the use of a less active or lower acid starter culture (that is, a culture which develops a lower maximum acidity in the mix), the level portion 12 of the acidity curve $A^1$ can be made lower, which, in turn, depresses the corresponding portion of curve $C^1$; and so in this way too the prescribed relation of the curves can be obtained.

In the preferred practice, this relation of the curves is obtained by using in the mix a relatively large quantity of low acid starter culture, as illustrated by the curves $A^2$, $P^2$ and $C^2$ in Fig. 1. For example, a starter culture producing a maximum acidity of about .72% at a pH of about 4.5, under the temperature conditions of the set (about 90° F.), may be used in an amount of 10-20% of the volume of milk, together with 1.5 oz. of calcium chloride and .1 oz. of rennet per 1000 lbs. of milk. As shown in Fig. 1, the titratable acidity levels off at a value of about .72% and the pH levels off at about 4.5 after a setting period of five hours, by which time the compressibility of the curds has levelled off at about 13%. Thus, by starting the centrifugal separation of the batch at the point 15, the separation can be completed while the compressibility of the curds is at or near maximum and after the chemical reactions have progressed to the necessary extent. Accordingly, the curds discharged from the separator will have a good texture and will be of approximately maximum solids content (usually well over 18%). It will be noted that the centrifuging could be started after about four hours of setting and still produce curds of desired texture and dryness, because at this point the acidity has reached about .68% at pH of about 4.6, and the compressibiity is about at its maximum of 13%. However, the levelling of the values at the point 15 enables the centrifuging to be carried out thereafter under the prescribed conditions as to acidity, pH and compressibility, and by prolonging the setting to a period of about five hours, the texture of the curds is improved.

Figure 2:
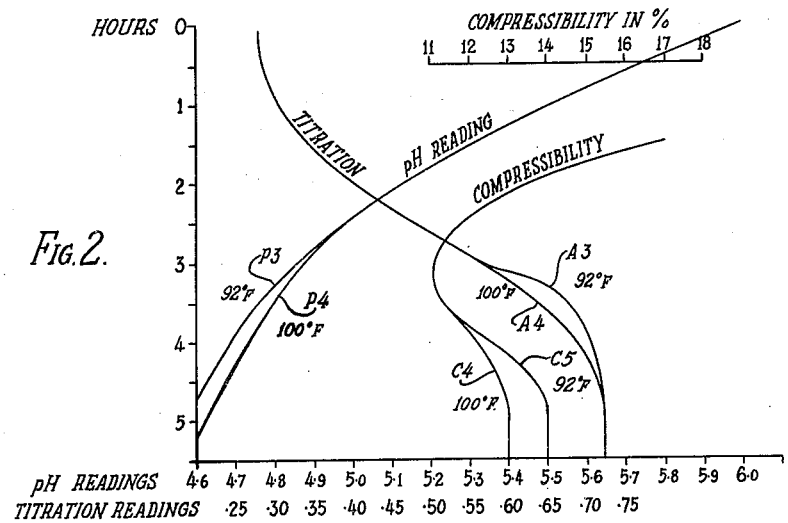
Figs. 2 and 3 are graphs of curves showing changes in the pH value, titratable acidity and compressibility of the curds of two different mixes made according to the Strezynski process, and illustrating the optimum conditions for the centrifuging and the effect of heating the mix prior to the centrifuging.

Referring now to Fig. 2, the curves there shown are illustrative of the behavior of a set prepared according to the Strezynski process as follows: The starting material was 30 cans of skim-milk having a pH of 6.05 and a titratable acidity of .15% at a temperature of 76° F. To this a low acid starter was added intermittently in a total amount of 5 cans and then 4 oz. of calcium chloride and 9 cc. of rennet were added, at which time the mix was at a temperature of 92° F. and had a pH of 5.95 and a titratable acidity of .28%. The mix was then set at this tempearture for a period of about three hours, at which time it was divided and one part was heated to a temperature of 100° F. while the other part was held at the initial setting temperature of 92° F. The setting of these two parts at their respective temperatures was continued to provide a total setting period of about five hours, whereupon the centrifuging of the sets was commenced.

As shown in Fig. 2, at the end of this setting period the pH curve $P^3$, acidity curve $A^3$ and compressibility curve $C^3$, for the set maintained at 92° F., levelled off at about 4.5–4.6, .72% and 14%, respectively. In the case of the set which was heated from 92° F. to 100° F., the pH curve $P^4$ levelled off at a somewhat higher value (slightly less than 4.6) and the acidity curve $A^4$ reached the same levelling point as the curve $A^3$ but at a different rate. However, the compressibility curve $C^4$ levelled at the lower percentage factor (higher compressibility) of 13%. In both cases, the compressibility was held near its optimum or maximum after the acidity had reached .68% and the pH had become 4.8 or less. Thus, in both cases, a relatively dry curd of good texture is produced by centrifuging the mix at the conclusion of the setting period of about five hours. In the case of the set which was heated to 100° F., the curds discharged from the centrifuging operation are somewhat drier than the curds discharged when centrifuging the other set.

Figure 3:
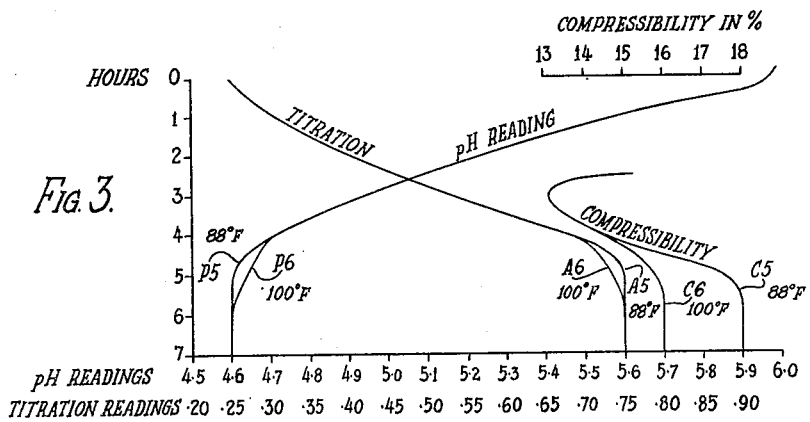

In Fig. 3, are curves illustrating the behavior of a cheese set made in accordance with the Strezynski process and consisting of 40 cans of skim-milk, 5 cans of low acid starter, 5 oz. of calcium chloride, and 12 cc. of rennet. The additives were introduced gradually into the skim-milk, and at the start of the setting period the mix had a titratable acidity of .25% and a pH of 5.98. The mix was then set at a temperature of 88° F. for about four hours, at which time it was divided and one part was heated to 100° F. while the other part was held at the initial setting temperature of 88° F. The setting of these two parts at their respective temperatures was continued to provide a total setting period of about five hours, at which time the centrifuging operation was started.

As shown in Fig. 3, at the end of this setting period the pH curve $P^5$, acidity curve $A^5$ and compressibility curve $C^5$ levelled off at about 4.6, .75% and 18%, respectively, in the case of the set which was maintained at 88° F. In the case of the set which was heated to 100° F., the pH curve $P^6$ and acidity curve $A^6$ reached the same levelling points as the curves $P^5$ and $A^5$, respectively, but at a slower rate. The compressibility curve $C^6$ levelled at the lower percentage factor (higher compressibility) of 16%. Accordingly, in both cases the curds discharged from the centrifuging operation had a somewhat lower percentage of solids than the curds obtained in the examples illustrated in Fig. 2, due to the better compressibility of the curds in the Fig. 2 examples during the centrifugal separation of the curds. However, in both of the Fig. 3 examples the compressibility curves $C^5$ and $C^6$ were caused to level off near the optimum or maximum compressibility after the acidity had reached .68% and the pH had become 4.8 or less, so that the curds discharged from the centrifuge were relatively dry as compared with the curds which would have been discharged if the increase in titratable acidity (and hence the decrease in compressibility had not been checked. If it had been desired to obtain drier curds in the Fig. 3 examples, this could have been accomplished by the use of a lower acid starter to cause the curves $A^5$ and $A^6$ to level off at an acidity nearer .68%. Also, by heating the set to 100° F. at an earlier stage of the setting operation, the curve $C^6$ would have levelled off at a lower percentage factor so as to provide a better compressibility during the centrifuging, thereby increasing the solids content of the discharged curds.

It will be observed from Figs. 2 and 3 that the levelling of the compressibility curves near the optimum compressibility of the curds (minimum percentage factor), after the titratable acidity has reached about .68%, gives ample time for centrifugal separation of a large batch of the cheese mix. This enables large-scale production of curds which are uniformly relatively dry and of good texture.

Figure 4:
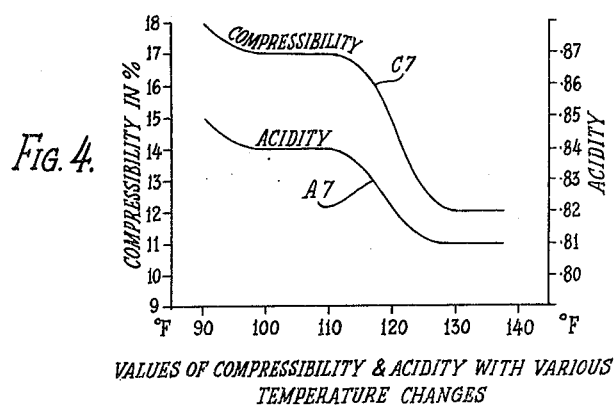
Fig. 4 is a graph of curves illustrating the effect of heating the mix above 100° F. at the conclusion of the setting and prior to centrifuging, with regard to titratable acidity and compressibility of the curds.

Referring now to Fig. 4, the curves there shown illustrate the effects of heat treatment of the set in stabilizing or reducing the titratable acidity and increasing the compressibility of the curds prior to centrifuging. These curves are based upon a mix similar to those previously described but which was allowed to set too long so that its acidity increased to about .87% and its pH dropped to about 4.5. The set was then divided into six batches which were heated, respectively, to 90° F., 100° F., 110° F., 120° F., 130° F., and 140° F. The curd compressibility and titratable acidity values of the separate batches were determined and plotted to form the compressibility and acidity curves $C^7$ and $A^7$, respectively. As shown in Fig. 4, the heating from 90° F. to 100° F. causes a fairly sharp drop in both the acidity and the compressibility factor, and then both these values remain constant from 100° F. to 110° F. Then there is another sharp drop in both values between 110° F. and 130° F., whereupon they level off again between 130° F. and 140° F. Thus, at the higher acidities, the heating of the set to about 100° F. not only arrests the normal increase in acidity and loss of compressibility but actually reverses the trend so that the acidity is reduced and the compressibility of the curds is improved; and by heating to the 110°–130° F. range, this effect is even greater.

According to the preferred practice of the Strezynski process, this heat treatment at either the lower or higher temperatures is used when the acidity cannot otherwise be held at about .8% or less for a sufficient time to enable the entire set to be centrifuged while the compressibility of the curds is near the optimum, or when the acidity has increased too much due to mistakes or carelessness of operators or to a faulty starter. For example, if the amount of set is such as to require a prolonged period of centrifuging (e. g., 2–3 hours), heating the mix to about 100° F. prior to the centrifuging will generally suffice to maintain the desired conditions for the longer period. If acidity has been allowed to go too high to be rectified by heating to 100° F., the higher temperature of 110°–130° F. is used in order to enable centrifugal separation of the set at an acidity of .8% or less and while the compressibility of the curds is near the optimum or maximum. For batches of usual commercial size, the best results are obtained by the use of a starter producing a low acid development of .7–.75% titratable acidity at a pH of about 4.7, and effecting a prolonged retarding of the acidity at this point by heating the set to about 100° F. prior to the centrifuging, so as to allow ample time for the centrifugal separation under the best conditions.

A further example of the Strezynski process is as follows: Skim-milk is brought to a temperature of 88° F. and is then treated with a low acid starter in an amount of 15% by volume of the milk. The mix is set for about one hour, at which time the titratable acidity is .2%, and is then treated with rennet and calcium chloride in amounts, respectively, of .1 oz. and 1.5 oz. per 1000 lbs. of milk. The mix is then kept at the temperature of 88° F. for about 3½–4 hours. After this initial period, the pH is about 4.75 and the acidity about .68%. The mix is then stirred, preferably in a closed vessel, for a period of about 15 minutes, at which time the pH is about 4.7 and the acidity about .72%. While the set is being mixed, the temperature in the setting vat is raised to about 100° F. Upon completion of this mixing and heating, the set is centrifugally separated. If the heating to 100° F. is omitted, the moisture content of the curds discharged from the centrifuge is higher (about 78%) and while the cheese could be used as a cottage cheese, it would not be suitable as bakers' cheese, since the latter should have a moisture content no greater than about 74–75%.

Another example is a cheese mix consisting of 80 cans of skim-milk, 9 cans of low acid starter, 10 oz. of calcium chloride, and 23 cc. of rennet, the mixing being set at 88° F. for about 6 hours, at which time the pH is about 4.7 and the titratable acidity about .73%. The set is then centrifuged at about 100° F.

As another example, a cheese mix was made consisting of 39 cans of skim-milk, 6 cans of low acid starter, 4 oz. of calcium chloride and 9 cc. of rennet, and was set at 90° F. The data on the setting of the mix were as follows:

| Time (Hrs.) | pH | Titratable Acidity (Percent) | Compressibility Factor (Percent) |
|---|---|---|---|
| 2 | 5.55 | .36 | 23 |
| 3 | 5.32 | .45 | 15 |
| 4 | 5.05 | .57 | 10 |
| 5 | 4.82 | .65 | 9 |
| 6 | 4.65 | .68 | 10 |
| 7 | 4.62 | .74 | 10 |

The set was then mixed in the vat for a period of ten minutes, whereupon the centrifuging run was commenced with a standard De Laval AC–VO centrifuge having .050" caulk discs provided with 2 sets of distribution holes at radii of about 3 and 4¾ inches, respectively, from the bowl axis. The peripheral outlets of the bowl, for discharging the curds, consisted of four nozzles which will be described presently. The set was centrifuged at a temperature of about 87° F. When the set had been mixed and fed through a centrifugal pump leading to the centrifuge, the curds had a compressibility factor of about 16%. The centrifuging of the set was started about 7¼ hours after the beginning of the setting period and was completed in about thirty-five minutes. The whey was discharged from the centrifuge (De Laval AC–VO) at a rate of about 770 gal./hr. during the first half of the centrifuging run, and then at a lower rate of about 685 gal./hr. At the higher discharge rate, the whey contained about 2% solids (by volume) and at the lower rate it contained about .36% solids. The solids content of the curds discharged from the centrifuge varied between approximately 27% and 28% (by weight).

The Strezynski process can be used for making a great variety of skim-milk cheeses, such as bakers' cheese, base cheese for spreads, and cottage cheese. The nature and amount of the additive or additives to the skim-milk may be varied to provide the desired flavor and other characteristics of the final product, within the limits previously defined with respect to control of the titratable acidity and pH of the set to obtain relatively dry curds of good texture from the centrifuge. In the production of cottage cheese, for example, it may be desirable to add "Sea-Lac" and omit calcium chloride and rennet. In this case, the starter may be added in an amount of about 15% of this skim-milk, and a coagulent may also be added which is a calcium fortifier and which may be any one of the coagulants commonly used for cottage cheese precipitation.

As previously mentioned, a low acid starter culture is preferably used in relatively large quantity in preparing the cheese mix. While such starters are available commercially, I shall now describe by way of example a procedure for preparing a low acid starter culture from a standard commercial culture for fermented milk products:

First propagation

A 500 ml. Pyrex Erlenmeyer flask of selected milk is placed into a Dixie retort and held at 15 p. s. i. for 15 minutes. This steam pressure sterilizes the flask and milk at 230°–240° F. Non-absorbent cotton is used for stoppering the flask, the cotton plugs extending downward about 1½ inches into the neck and having a square of clean parchment tied over the top. Extreme care must be taken after removal of the flask from the retort, to guard against contamination. The flask of milk is then cooled to 80° F., and the commercial culture is added and thoroughly mixed with the milk. The flask is then placed in a culture cabinet and its content incubated overnight, until a soft curd is formed (from 9–12 hours). It is then refrigerated until the following evening when the second propagation is made.

Second propagation

A flask of milk is sterilized as previously described and cooled to 70° F. It is then inoculated with about 1% of the fresh culture, a sterilized pipette being used for this purpose. Then it is placed in the culture cabinet and incubated overnight at 70° F., until a soft curd is formed, after which it is refrigerated until the following evening when the third propagation is made.

Third, fourth and succeeding propagations

The third, fourth and succeeding propagations follow in the same manner as previously described, the amount of inoculation being regulated to give the desired development in 9–12 hours. The culture derived from the second propagation is usually suitable as a low acid starter for making the cheese mix, but the culture should be propagated every day or two in order to keep it healthy and active. The degree of ripeness or acidity depends upon the length of incubation.

Figure 5:
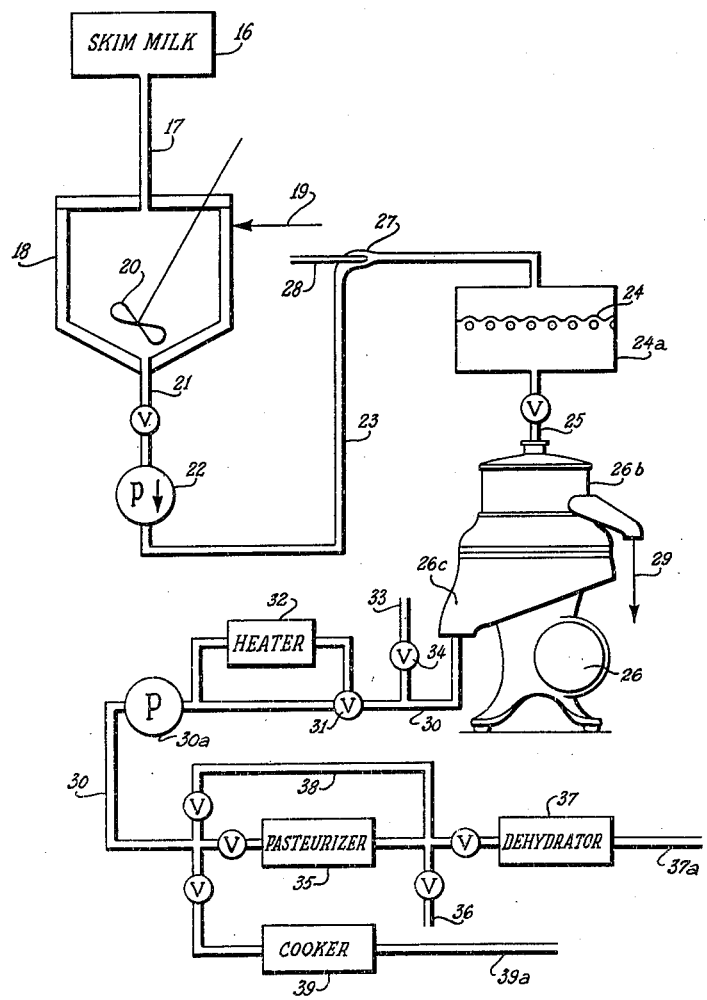
Fig. 5 is a diagrammatic view of a preferred installation for use in carrying out my new process.

Referring now to Fig. 5, I have there shown schematically (and partly in section) an installation for carrying out the new process. It comprises a closed tank 16 for receiving a supply of skim-milk obtained, for example, from a centrifugal separator (not shown) adapted to separate whole milk into its cream and skim-milk components. For most skim-milk cheeses, the skim-milk should have a fat content of not more than .1%. The skim-milk is passed through a pipe 17 to a holding or setting tank 18 which is likewise closed. This tank is jacketed and provided with a pipe line 19 for introducing a heating fluid into the jacket space. After the desired quantity of skim-milk has been accumulated in the tank 18, the skim-milk is inoculated with the curdling agent or starter culture, and any other additive to be included in the final product is introduced. The additives may be introduced through a small opening (not shown) in the tank 18. Mixing of the additives with the skim-milk may be effected by means of a mechanical stirrer 20. The cheese mix is then set in the tank 18, the mix being brought to and maintained at the setting temperature by the fluid fed to the jacket space through pipe 19.

The starter, as previously mentioned, preferably is a low acid culture, and is added in an amount of 10–20% by volume of the milk. Good results are obtained by setting the mix in the tank 18 at a temperature of 88° F. for about 4 hours, and controlling the additives so that at this point the pH of the set is about 4.8 and its titratable acidity is about .7%, at which time the centrifuging operation is started. Usually, it is desirable to subject the set to mild agitation, as by means of the stirrer 20, just before the centrifuging is commenced. The purpose of this agitation is to obtain a uniform mixture of precipitated curds and whey within the tank 18, but the agitation should be milk in order to prevent aeration of the curds, which would tend to lower their specific gravity and make it more difficult to centrifugally separate them from the lighter whey.

The mixture of precipitated curds and whey is centrifuged by feeding it from the bottom of tank 18 through a pipe 21, positive pump 22, pipe 23 and strainer 24, into a feed tank 24a, from which it flows by gravity through pipe 25 to the centrifugal separator 26. The strainer 24 serves to prevent passage to the centrifuge of curds sufficiently large to clog the nozzles through which the curds are discharged from the centrifugal bowl. During its passage to the centrifuge 26, the mixture of curds and whey is preferably heated to about 100° F. or higher, by means of an instantaneous heater 27. As shown, the heater 27 is a steam injector having a supply pipe 28 by which steam of suitable quantity and temperature is introduced into the mixture flowing through pipe 23. In cases where the pH of the mix at the start of the centrifuging is substantially lower than 4.8 (e. g. 4.6 or less), its temperature is preferably raised above 100° F. by heater 27, in order to counteract the loss of compressibility of the curds which would otherwise occur. Also, in separating a large batch of the mix, it is desirable that the temperature to which the mix is heated when it passes to the centrifuge be gradually increased above 100° F., to counteract the increase in lactic acidity which would occur over the relatively long period required for centrifuging the entire batch. This can be accomplished by gradually increasing the supply of steam through pipe 28.

The curds discharged into the stationary cover or collector 26c have a low butter fat content, well below 8%, and are a skim-milk cheese or base curds of the cottage cheese type. Heretofore, when cottage cheese type curds of this low fat content were heated to about 130° F., they would "whey out" and separate into free whey and hard, lumpy casein, since cottage cheese type curds of low fat content made by conventional bagging or draining procedure are inherently unstable to such heating. The use of centrifuging to separate curds from whey has previously been proposed and used for the purpose of eliminating much of the time, expense and handling required for bagging and draining; but prior to my invention it was not known that cottage cheese type curds of low fat content, separated centrifugally as a heavier component than the whey, would behave any differently than conventionally separated curds of the same fat content, when heated to a temperature of about 130° F. My invention stems from the discovery that curds of the cottage cheese type thus separated centrifugally have the unique characteristic of being stable under such heating, even when their fat content is as low as possible.

According to my invention, the base curds from the stationary receiver 26c of the centrifuge are delivered into a pipe line 30 for heat treatment. Preferably, the curds are discharged from the centrifugal bowl into the receiver 26c with a minimum of 20% milk solids, by following the Strezynski process as previously described. In some cases, it may be desirable to discharge the curds from the centrifuge with about 25% solids, or an even higher percentage, but if this percentage exceeds about 30%, the curds will generally be too viscous for normal pumping even when they are heated to a temperature well over 100° F. In cases where the temperature of the discharged curds is too low for pumping purposes, in view of the relatively high solids content of the curds, I prefer to pass them immediately through a preliminary heater 32 communicating with the pipe line 30. Usually, the curds can be pumped easily at a temperature of 95–110° F., even when their solids content is substantially above 20% by weight; and the heater 32 may be used to supply the heat necessary to bring the curds to the temperature at which they will have a sufficiently low viscosity for easy pumping. If the curds are discharged from the centrifuge at the proper temperature and viscosity for pumping, then the heater 32 may be by-passed by adjustment of valve 31, so that the curds pass directly to the positive pump 30a in the pipe line 30.

In some cases, it may be desired to dilute the discharged curds with water in order to reduce their viscosity sufficiently for easy pumping. In such cases, the water diluent may be admitted into the pipe line 30 from a water pipe 33 by way of a valve 34. Preferably, the water is heated to at least the temperature of the discharged curds with water in order to reduce their viscosity in the pipe 30. It is also possible to dilute the separated curds with water fed into the peripheral part of the bowl of centrifuge 26, at the region of the discharge nozzles for the curds. Centrifuges equipped for this purpose are well-known in the art and require no detailed explanation. The pump 30a may in some cases be arranged in advance of heater 32 and pipe 33, so as to receive the curds directly from the centrifuge; or the curds may be discharged from the centrifuge into a kettle where they are heater and/or diluted with water, if necessary, before passing to the pump 30a. It will be understood that discharged curds passing to the pump 30a should in any event have a low enough viscosity for easy pumping, as a result of the water dilution or the heating at 32, or both, or because of the relatively high temperature and low viscosity, at which the curds are discharged from the centrifuge.

The pump 30a delivers the curds through a pipe line 30 to the main heat treating operation, where they are heated to a temperature of at least 130° F. This main heat treating operation may take various forms. In one form of the invention, the curds are pumped through a pasteurizer 35 where they are heated to a temperature between 130 and 180° F., the pasteurized curds being then discharged from the system through pipe 36. In another form of the invention, the curds are passed to a dehydrator 37 by way of a pipe 38. The dehydrator 37 may be a conventional spray drier, such as the so-called "Rogers" spray drier or a high speed revolving centrifugal atomizer located in the heat treating chamber. The dehydrated cheese product, in the form of a powder containing usually from 3 to 8% moisture, is discharged from the dehydrator at 37a. This powder can be made into a reconstituted cheese by merely mixing the desired quantity of water with it. If desired, butter fat may be added to the base curds prior to the dehydrating operation, as by introducing sweet cream into the pipe line 30 through the pipe 33. The resultant products, depending upon the extent of creaming and the manner of preparing the cheese set to be centrifuged, can be identified as (a) dehydrated creamed cottage cheese, (b)

dehydrated neufchatel cheese and (c) dehydrated cream cheese. The dehydrating operation at 37 may be effected with or without a preceding pasteurizing operation at 35.

In another form of the invention, the curds in the pipe line 30 are pumped through a cooker 39 where they are cooked sufficiently for packaging as a final product. For example, the curds may be heated in the cooker 39 to a temperature of about 145° F. to make a cottage cheese. The cooked curds are discharged to pipe 39a and may then be cooled and packaged.

It will be understood that the particular heat treatment to which the base curds are subjected may be selected by the adjustment of the various valves as illustrated.

I claim:

1. In the production of cheese products of the cottage cheese type by forming a substantially fat-free cheese mix including milk of low fat content and a starter, and setting the mix to coagulate the curds and form an acid mixture of curds as a heavier component and whey as a lighter component, the improvement which comprises centrifuging the mix after the setting thereof, to separate from the whey a base curd component of the cottage cheese type having less than 8% by weight of butter fat, discharging the separated curd component through the outer periphery of the centrifuging locus and collecting the discharged curd component, and heating the collected curd component to a temperature of at least 130° F. for further processing thereof.

2. The improvement according to claim 1, in which the collected curd component is heated to a pasteurizing temperature.

3. The improvement according to claim 1, in which the curd component is discharged from the centrifuging with a minimum of 20% by weight of milk solids.

4. The improvement according to claim 1, comprising also the step of blending cream with the separated curd component.

5. The improvement according to claim 1, comprising also the step of dehydrating the curd component after said heating thereof.

6. In the production of cheese products of the cottage cheese type by forming a substantially fat-free cheese mix including milk of low fat content and a starter, and setting the mix to coagulate the curds and form an acid mixture of curds as a heavier component and whey as a lighter component, the improvement which comprises centrifuging the mix after the setting thereof, to separate from the whey a base curd component of the cottage cheese type having less than 8% by weight of butter fat, discharging the separated curd component through the outer periphery of the centrifuging locus and collecting the discharged curd component, and heating and dehydrating the collected curd component.

7. The improvement according to claim 6, in which said dehydrating is effected by spray-drying the curd component.

8. The improvement according to claim 6, in which the curd component is discharged from the centrifuging with a minimum of 20% by weight of milk solids and is then diluted with water and pumped at a temperature of at least 90° F. to the dehydrating operation.

9. The improvement according to claim 6, in which the collected curd component is heated to a pasteurizing temperature prior to the dehydrating.

10. The improvement according to claim 6, in which the collected curd component is heated and then pumped to the dehydrating operation.

11. The improvement according to claim 6, in which the mix is heated to a temperature of at least 90° F. for the centrifuging, the curd component is discharged from the centrifuging with a minimum of 20% by weight of milk solids, and the collected curd component is pumped at a temperature of at least 90° F. to the dehydrating operation.

12. The improvement according to claim 6, comprising also the step of blending cream with the separated curd component prior to said dehydrating thereof.

References Cited in the file of this patent

UNITED STATES PATENTS

| | | |
|---|---|---|
| 526,165 | Salenius | Sept. 18, 1894 |
| 567,522 | Turner | Sept. 8, 1896 |
| 2,387,276 | Link | Oct. 23, 1945 |
| 2,415,239 | Flowers et al. | Feb. 4, 1947 |
| 2,574,508 | Strezynski | Nov. 13, 1951 |

OTHER REFERENCES

"The Manufacture of Low-Acid Rennet-Type Cottage Cheese," United States Dept. of Agriculture, Miscellaneous Publication No. 119, revised February 1934, pages 5 and 6.